United States Patent [19]
Hayashi

[11] Patent Number: 5,850,772
[45] Date of Patent: Dec. 22, 1998

[54] METHOD OF CONTROLLING FLY CUTTING ROTARY SHEAR

[75] Inventor: Shigeki Hayashi, Tama, Japan

[73] Assignee: Nusco Co. Ltd., Tokyo, Japan

[21] Appl. No.: 877,803

[22] Filed: Jun. 18, 1997

[30] Foreign Application Priority Data

Jun. 24, 1996 [JP] Japan ................................. 8-163310

[51] Int. Cl.$^6$ .................................................. B26D 1/56
[52] U.S. Cl. ...................... 83/37; 83/63; 83/76; 83/76.6; 364/472; 364/474.35
[58] Field of Search ................................. 83/37, 61, 62, 83/63, 65, 69, 72, 76, 76.1, 76.6; 364/472, 474.35

[56] References Cited

U.S. PATENT DOCUMENTS

| | | |
|---|---|---|
| 3,744,889 | 7/1973 | Sable .......................................... 399/2 |
| 3,811,354 | 5/1974 | Ito ............................................ 83/320 |
| 3,869,948 | 3/1975 | Rau .......................................... 83/286 |
| 4,058,041 | 11/1977 | Ito ............................................ 83/305 |
| 4,846,033 | 7/1989 | Uehlinger et al. ......................... 83/94 |
| 5,054,304 | 10/1991 | Hayashi et al. ............................ 83/65 |
| 5,122,964 | 6/1992 | Hayashi et al. ............................ 83/37 |

*Primary Examiner*—M. Rachuba
*Attorney, Agent, or Firm*—Pollock, Vande Sande & Priddy

[57] ABSTRACT

During a remaining time which is defined by excluding a positioning settling time $t_s$ and a cutting time interval $t_T$ during which a cutting edge is brought into contact with a stock from a period of time T allotted to a cutting operation which is determined by a preset length $L_0$ and a stock running speed $V_A$, the cutting edge maintains a speed difference $\Delta$ which is as small as possible relative to $V_A$ during a fraction of the remaining time which is as long as possible. An acceleration which causes the speed difference $\Delta$ is chosen to be as less as possible below a maximum acceleration which is demanded by the machine specification.

15 Claims, 8 Drawing Sheets

METHOD OF CONTROLLING FLY CUTTING ROTARY SHEAR

BACKGROUND OF THE INVENTION

The invention relates to a method of controlling a rotary shear for cutting a running stock on its fly by cutting edges which rotate under numerical control while the cutting edges are tracking the running stock in which the rate of rotation of the cutting edges is changed under numerical control between successive cuts so that a cut length is brought into coincidence with a preset value.

FIG. 1 shows a rotary shear including a pair of cutting edges 11, 12, between which a running stock 13 is passed to be cut by the meshing engagement between the edges 11, 12. To synchronize the running speed of the stock with the rotational speed of the edges 11, 12, the shear includes a variable speed gearing 15 such as a non-circular gear or differential gear which transmits the rotation of a motor 14 to the edges 11, 12 while changing the speed as a point on the stock 13 which is to be cut passes between the edges 11, 12, in addition to retarding or accelerating the mean speed for one revolution of the edges in accordance with the magnitude of the desired cut length. However, with such a variable speed gearing 15, it is difficult to change the cut length during the running of the stock or a tremendous work is required for the on-site adjustment of the variable speed gearing in accordance with a desired change in the cut length in order to assure the cutting accuracy. In view of this, a numerical control technique which permits a desired change in the cut length of the stock by causing the rate of rotation of the cutting edges 11, 12 to be directly changed by the motor 14 is proposed in U.S. Pat. No. 4,266,276 and U.S. Pat. No. 5,122,964 (the latter being issued Jun. 16, 1992) and demonstrated a significant effect in its practical use. Since then, the application of the technique is extended to the on-the-fly cutting of not only steel sheets or pipes, but also to any stock inclusive of nonferrous metals, corrugated paperboards, papers, films and any other stocks. Concomitantly, a variety of developments and sophistication have been made in a mechanical mechanism including the cutting edges depending on the kind of stocks being cut. However, the numerical control technique itself which is applied to the motor 14 basically remains the same as in the initial implementation.

Specifically, a speed control waveform of the prior art which is used with a motor driving cutting edges in order to cut a running stock at various lengths is basically as shown in FIG. 2 where the abscissa represents time T while the ordinate represents a speed V.

For a longer cut length, the cutting edges remain at their home position to let the stock to start its movement alone, and begin to rotate as the point on the stock which is to be cut approaches, accelerating their rotational speed so that it becomes equal to a stock speed $V_A$, followed by an on-the-fly positioning control which includes achieving a synchronization between the stock speed and the edge rotational speed at a point immediately preceding a zone θ where the edges come into contact with the stock and maintaining the edges in the zone θ at the position of cutting the stock, as indicated in FIG. 2A. Subsequently, a zone γ which maintains the speed of the edges follows immediately after the zone θ, and then the edges are decelerated as the home position is approached in order to return them to the home or starting position as early as possible and to stop them thereat, in preparation to the initiation of the next cycle.

A control for an intermediate cut length is illustrated in FIG. 2B where on-the-fly positioning control occurs up to the zone θ similarly as before. After the cutting occurs, the speed is maintained in the zone γ to allow the edges to be returned to their home position. However, in the course of subsequent deceleration, a next point on the stock which is to be cut is approaching before the motion of the edges is stopped. Accordingly, the deceleration is interrupted and the acceleration is resumed.

For a shorter cut length, as illustrated in FIG. 2C, the zone θ is immediately followed by the acceleration. However, in the course of the acceleration, a point to be cut is approaching, whereby the acceleration is interrupted and is replaced by the deceleration. At a point immediately preceding the zone θ, a tracking positioning control is entered in the same manner as for a longer and an intermediate cut length. Upon termination of the zone θ, the acceleration is immediately resumed. The described operation is subsequently repeated.

With a shorter cut length, the motor may sometimes be accelerated to its maximum rated speed in order to establish a reduced length of time between cuts and to reduce the time required for one revolution of the edges. In this instance, the control may shift from the maximum rated speed or over-top condition to the deceleration positioning before the zone θ is entered.

In actuality, the zone θ does not establish a flat or constant speed as shown, but frequently the motor speed is adjusted in conformity to the mechanical structure so that the edges 11, 12 run in the same direction and at the same rate as the stock 13. Where an increased torque is required to sever a slab, a corresponding compensation is needed and a cutting impact must be taken into consideration, whereby the zone θ assumes a complicated speed waveform. The zone γ which follows upon completion of cutting also assumes various forms in conformity to the mechanical structure. By way of example, a special edge-relieving speed (a temporarily uprated speed) may be employed to prevent a severed stock from contacting either edge 11 or 12.

FIG. 3 shows a conventional numerical control system which achieves various speed control profiles as described. A length measuring roll 16 is held in rolling contact with a running stock 13 and drives a length measuring encoder 17, which operates to produce a pulse for a given travel of the stock 13. The pulse is counted by a length counter 18, which is cleared at the time the cutting is completed, for example, or at the end of the zone θ. Thus a count in the counter 18 indicates a length $L_1$ which the stock 13 has traveled since the clearing of the counter.

An on-the-fly rotary shear 19 is disposed along the path of the stock 13, and includes an upper and a lower cutting edge 11, 12 which are fixedly mounted on drums 21 and 22, respectively, to which the rotation of the motor 14 is transmitted through a distribution gear 15 to cause the drums to rotate in directions indicated by arrows, thus allowing the stock 13 to be cut by a meshing engagement between the both edges 11, 12. The motor 14 also drives an encoder 23 for rotation, and pulses from the encoder 23 are counted by counters 24 and 25. The counter 24 is cleared upon completion of the cutting (or at the end of the zone θ) while the counter 25 is preset, at the same instant, to $L'_{2H}$, a length to go to the home position, as will be described later. A count $L_2$ in the counter 24 corresponds to an angle of rotation of the edges 11, 12 from the end of the zone θ. Assuming that the edges 11, 12 run horizontally in the same manner as the stock 13, it follows that $L_1-L_2$ represents a length of stock portion which lies ahead of the edges 11, 12, and accordingly, a control is made so that $L_1-L_2$ equals a preset cut length $L_0$ However, it will be understood that a horizontal travel of each edge 11, 12 returns to zero after one revolution of the associated drum, and this must be previously considered in determining the magnitude of the preset length $L_0$. Specifically, one revolution length $L_{20}$ of the edge is initially subtracted from the preset length $L_0$ to provide an apparent preset length $L'_0=L_0-L_{20}$. In this manner, the motor 14 is controlled such that the preset length $L_0$ from which the length of stock portion lying ahead of the edges, namely $L_1-L_2$, is subtracted or a remaining length $E=L'_0-L_1+L_2 = L_0-L_{20}-L_1+L_2$ can be sequentially brought to zero. It will be seen that $L_2=L_{20}$ applies at an interval corresponding to one revolution of the edge or an interval from one cut to another cut, resulting in achieving $E=L_0-L_1=0$. This means that the cut length is equal to the predetermined length $L_0$. The above has described the fundamental principle disclosed in the cited U.S. patents. In addition, a speed loop is incorporated as a minor loop in order to implement the principle of servo control of $L_2$ over $L_1$. In the example shown in FIG. 3, the pulse from the encoder 23 is converted through a frequency-to-velocity (FV) transducer 26 into the rotational speed of the motor 14 which is fed back to a motor drive signal. An amplifier and driver circuit (DRV) 27 for the motor 14 may comprise a thyrisitor converter for a d.c. motor, or a PWM vector inverter for an a.c. motor, and an output from the FV transducer 26 is fed back to the driver circuit 27. On the other hand, the pulse from the encoder 17 is converted into the stock speed $V_A$ in an FV transducer 28. A cut length presetter 29 provides the preset or predetermined cut length $L_0$, from which one revolution edge length $L_{20}$ is subtracted in an adder 31. Using the apparent preset length $L'_0=L_{0-L20}$, $L_1$ and $L_2$, an adder 32 calculates a remaining length $E=L'_0-L_1+L_2$. In order to provide a linear change in the speed in response to a change in the remaining length E, a numerical speed converter (DV) 33 having a root function $\pm|E|^{1/2}\alpha V_B$ converts the remaining length E into a remaining length speed $V_B$ which is fed to an adder 34, which in turn determines a corrected remaining length speed $V_C=V_A-V_B$ or a speed reference $V_R$. For a longer or an intermediate cut length $L_0$, the remaining length E is positive, and thus $V_A>V_C$. Thus $L_1$ leads $L_2$, and the remaining length E approaches 0. For a shorter cut length, the remaining length E is negative, and thus $V_A<V_C$. Then $L_2$ leads $L_1$, and the remaining length E approaches 0.

In actuality, the remaining length E does not equal 0, giving rise to a residual deviation. To accommodate for this, a residual deviation $e_0$ in the remaining length E is incorporated into the preset length $L_0$ before both the counter 18 ($L_1$) and the counter 24 ($L_2$) are cleared. Accordingly, the operation starts with $E=L'_0+e_0$, and the edges 11, 12, tracking the stock 13, enter the zone θ in FIG. 2 with a current pass residual deviation $e'_0$. In the zone θ, $E=L'_0-L_1+L_2+e_0=e'_0$. It follows that $e_0\approx e'_0$. After one revolution, $L_2=L_{20}$. Hence, $L_0-L_{20}-L_1+L_2=L_0+L_1\approx 0$. Thus the cut length is equal to the preset length. As mentioned previously in connection with FIG. 2, the speed is not uniform during the zone θ, and therefore, a compensation may be applied to the length measuring pulse, which is used as the reference, so that a horizontal component of the moving speed of the edges 11, 12 be synchronized with the movement of the stock 13.

To give an example, for the rotary shear shown in FIG. 3 which undergoes a circular motion, a multiplication by a factor 1/cos θ is applied to an input of each of the FV transducer 28 and the counter 18 in the zone θ. In addition, a sophistication is made to compensate for the motor torque required for the cutting in order to alleviate an impact drop on the motor 14, but this will not be dealt with herein.

An operation which follows the completion of the cutting or the end of the zone θ differs among a longer, an intermediate and a shorter preset length, as described below.

For a Longer Preset Length

Upon completion of the cutting, both the counter 18 and the counter 24 are cleared, and the preset length $L_0$ is preset in the presetter 29. Hence, the remaining length E increases as does $V_B$, causing $V_A-V_B=V_C<0$. $V_C$ is passed through a limiter (LM) 35, and it may be assumed that a slew rate or acceleration is limited to yield $V'_C$.

On the other hand, there is provided a control circuit which returns the cutting edges 11, 12 to their home position. In the example shown in FIG. 3, this corresponds to a combination of the counter 25, a numerical speed converter (D/V) 36 having a function $(L'_2)^{1/2}\alpha V_D$ which operates to provide a linear deceleration in response to a decrease in the count $L'_2$ of the counter 25, and a limiter (LM) 37 which limits an output from the converter 36. A comparator (CP) 38 compares an output $V'_C$ from the limiter 35 and an output $V'_D$ from the limiter 37 against each other to operate a change-over switch 39 so as to select whichever is the greater. The selected output is used as the speed reference, which is fed to the amplifier and driver circuit 27. It will be noted that the output from the FV transducer 26 is fed back to be subtracted from the speed reference in an adder 40.

The counter 25 is preset, at an instant of completion of cutting, to a count corresponding to the circumferential length $L'_{2H}$ which is measured from the prevailing edge position to the home position, and $V_D$ is at its maximum at this time, which however is limited by the limiter 37 to a value $V'_D$, chosen for purpose of edge-relieving, relative to the stock speed $V_A$. Since $V'_C<V'_D$ in this instance, the comparator 38 selects $V'_D$ as the speed reference, and this speed is maintained during the zone γ before the control of the motor 14 enters the deceleration at $V'_D=V_D$ as $V_D$ decreases as a result of a decrease in the count $L'_2$ of the counter 25, eventually entering a positioning control phase to stop the motor in correspondence to $V_D\approx 0$.

Subsequently, a reduction in the remaining length E as the stock 13 continues to run decreases $V_B$. As soon as $V_C$ becomes positive, the comparator 38 selects $V'_C$ as the speed reference $V_R$, whereupon the motor 14 again enters the acceleration. When the acceleration results in removing the remaining length E, a servo control for $V_B\approx 0$ and $V_A\approx V_C=V'_C$ or on-the-fly positioning is entered to shift into the zone θ.

For an Intermediate Preset Length

In this instance, $V_B$ increases at the end of the zone θ even though the increase is not so much as occurs for a longer preset length. Thus, $V_C=V_A-V_B$ becomes negative or positive, and $V_C=V'_C<V'_D$. In the similar manner as for longer preset length, $V'_D$ is selected as the speed reference once, and subsequent to the zone γ, the deceleration is entered. However, in the present instance $V_C=V'_C$ rises again before the motion comes to a stop, and accordingly, in the course of the deceleration, the comparator 38 selects $V'_C$ as the speed reference $V_R$, thus resuming the acceleration and initiating the on-the-fly positioning.

For a Shorter Preset Length

This represents a case where $L_0<L_{20}$ or when the preset length $L_0$ is shorter than the circumferential length $L_{20}$ corresponding to one revolution of the edges. In this instance, at the end of the zone θ, the counters 18 and 24 are cleared, and $L_0$ and residual deviation $e_0$ are set into the presetter 29. The remaining length $E=L_0-L_{20}+e_0$ then becomes negative from the outset, and $V_B$ also becomes negative. Accordingly, $V_A-V_B=V_C$ becomes greater than $V_A$, and there occurs no switching to select $V'_D$ by the comparator 38, and the speed reference $V_R$ remains to be $V'_C$. In this instance, since $V_C$ exhibits a sharp rise, a rate of change in the speed reference $V_R$ is suppressed by the limiter 35 to an acceleration corresponding to the permissible torque of the motor 14. As mentioned previously in connection with FIG. 2D, the motor 24 sometimes reaches its maximum rated speed. In any event, the speed reference $V_R$ becomes higher than the stock speed $V_A$, and accordingly, the remaining length E changes from its negative value toward zero, and $V_C$ is also decelerated toward $V_A$. As $V_C$ decreases, $V'_C$ is no longer limited in the course of deceleration, reaching $V_C$, and thus subsequent to a shift to the deceleration, the on-fly-positioning takes place in the zone θ.

Although the control system is shown in FIG. 3 in terms of hardware, a software processing by the digitalization is recently often employed up to the amplifier and driver circuit 27, or specifically to a amplifier in the preceding stage except for the power driver circuit therein, and in such instance, the arrangement of FIG. 3 is realized in terms of software. In addition, recently, in place of the length measuring roll 16 which is disposed in rolling contact, a non-contact length measuring sensor such as a sensor of laser Doppler type, for example, can be used to derive a length measuring pulse.

Machine Specification

For more than two decades since the introduction of NC (numerically controlled) on-the-fly rotary shear into practical use, the fundamental specification of machines of this kind is still based on the stock running speed relative to the cut length, or in other words, on the determination or the choice of a running speed $V_A$, achieved by a particular acceleration/deceleration, to achieve a particular cut length $L_0$. Specifically, an L-V curve as shown in FIG. 4A which illustrates a relationship between a cut length L from a minimum length $L_{MIN}$ to a maximum length $L_{MAX}$ and a stock running speed (or line speed) V has been one of important items of the machine specification. It is to be noted, however, that the maximum line speed $V_{MAX}$ shown in FIG. 4A is not determined solely by a particular rotary shear, but is also influenced by a line (running speed) specification used in the processing before and after the roatry shear.

The manner of determining the motor speed waveform to satisfy the required L-V curve in the design of an L-V curve for NC rotary shear has a direct bearing with the present invention, and accordingly, numerical examples will be given below.

For a Longer Preset Length

A speed waveform which is important in selecting a motor 14 from the L-V curve is shown in FIG. 4B where $t_a$ represents an acceleration time to reach $V_{MAX}$ from a stationary condition, $t_s$ a settling time for positioning control which is normally on the order of 0.05 second or greater, $t_T$ a transit time through a zone θ, and $t_d$ a deceleration time from $V_{MAX}$ to a stop after the end of the zone θ until the home position is reached, the home position being set up at the circumferential length $L'_{2H}$ from the end of the zone θ.

It will be seen from FIG. 4B that any time span other than the settling time $t_s$ and the transit time $t_T$ which represent the minimum requirement can be utilized for purpose of acceleration and deceleration.

Suppose that V=150 m/min=2.5 m/s, circumferential length $L_{20}$=0.64 m, $t_s$=0.05 s, θ=45°, and the circumferential length $L_T$ of zone θ=(45/360)×0.64=0.08. At $V_{MAX}$, $t_T$=0.08/2.5=0.032 s. Since an area below the speed waveform represents the circumferential length $L_{20}$, we have:

$$(t_s+t_T+(t_a+t_d)/2)V_{MAX}=L_{20} \qquad (1)$$

Choosing $t_a=t_d$ and substituting figures into the equation (1) yields:

$$(t_a+0.05+0.032)\times 2.5=0.64$$

or $$t_a=0.174 \text{ s}$$

This means that a motor must be chosen which is capable of accelerating from a stationary condition to $V_{MAX}$ within 0.174 second under 100% torque including the inertia of the machine (inclusive of the motor). Motor ratings are skipping in a manner from 75 kW/500 rpm to 110 kW/500 rpm to 150 kW/500 rpm. Assume that the achievement of $t_a$=0.166 second is enabled as a result of the choice made from these ratings. In such instance, the allowable settling time is given as follows:

$$t_s=0.05+(0.174-0.166)=0.058 \text{ (second)}.$$

It will be seen that a total length of time from the commencement of rotation to the stop is given as T=0.166×2+ 0.058+0.032=0.422, meaning that one revolution is achieved by accelerating to 2.5 m/s in a time interval of 0.422 second. If the acceleration is started immediately or from time zero representing the stop condition, the resulting cut length will be given as follows:

$$L_0=0.422\times 2.5=1.055 \text{ m}$$

This length represents a boundary between the longer and the intermediate cut length.

Intermediate Cut Length

In the present example, when the cut length is reduced below 1.055 m, it represents an intermediate cut length, and a speed waveform as shown in FIG. 4C is employed. Since the time for the acceleration and the deceleration can be reduced for the same value of the $V_{MAX}$, a corresponding margin is available for the settling time $t_s$. It is assumed that same parameters are used as for the longer cut length.

Initially, $t_s$ for $L_0$=0.9 m is obtained. Each of the acceleration and the deceleration time is assumed to be equal to $t_1$. The stock runs at $V_{MAX}$ for a period T, and a length traveled is equal to $L_0$. Thus, T=0.9/2.5=0.36. Representing a difference between a speed at which a switching occurs from the deceleration to the acceleration and $V_{MAX}$ by Δ, we have: $\Delta/t_1=V_{MAX}/t_a$=2.5/0.166. A region 41 shown hatched in the speed waveform (or a region delineated by the acceleration line, deceleration line and the time axis for $V_{MAX}$) has an area which is calculated to be $\Delta\cdot t_1=L_0-L_{20}$= 0.9−0.64=0.26. Using the relationships obtained for the $\Delta/t_1$ and $\Delta\cdot t_1$, we have $t_1^2 = (0.166/2.5) \times 0.26$ or $t_1 = 0.1314\ s.$ Thus, we have $t_s = T - 2t_1 - t_T = 0.36 - 0.1314 \times 2 - 0.032$
$= 0.065$ A similar calculation can be repeated for different values of the cut length $L_0$ to provide the following results:

| $L_0$ (m) | T (2nd) | $t_1$ (2nd) | $t_s$ (2nd) |
|---|---|---|---|
| 1.055 | 0.422 | 0.332 | 0.058 |
| 0.90 | 0.36 | 0.131 | 0.065 |
| 0.85 | 0.34 | 0.118 | 0.072 |
| 0.80 | 0.32 | 0.103 | 0.082 |
| 0.75 | 0.30 | 0.086 | 0.097 |
| 0.70 | 0.28 | 0.063 | 0.122 |
| 0.65 | 0.26 | 0.026 | 0.176 |

The acceleration and the deceleration time $2t_1$ continues to decrease while the settling time $t_s$ continues to increase until $L_0 = L_{20}$ is reached, whereupon the acceleration and the deceleration become unnecessary, and theoretically the stock can be cut at any high rate.

Shorter Preset Length

When the preset length $L_0$ is less than the circumferential length $L_{20}$, a speed waveform as shown in FIG. 4D or 4E is used. In this instance, a portion $V_m$ on the L-V curve (FIG. 4A) which is located below $V_{MAX}$ represents a line speed. Same parameters are used as for the longer preset length. However, because over-top occurs, a top of the peripheral speed is calculated to be 120% of $V_{MAX}$, and a choice is made such that $V_{TOP} = 180$ m/min=3 m/s.

$V_m$ for a given value of $L_0$ is obtained. $V_m$ represents the maximum line speed relative to $L_0$. It is assumed that $L_0 = 0.4$ m. Representing a difference between a top peripheral speed $V_{TOP}$ and $V_m$ by $\Delta$, we have $\Delta/t_1 = V_{MAX}/t_a = 2.5/0.166$ Accordingly, a region 42 in the speed waveform which is located above $V_m$ has an area which is calculated as follows:

$\Delta \cdot t_1 = L_{20} - L_0 = 0.64 - 0.4 = 0.24$

From above relations we have $t_1^2 = (0.166/2.5) \times 0.24,$ or $t_1 = 0.1262\ s$ and $\Delta = 1.90$ m/s $V_m$ is determined from the minimum settling time $t_s = 0.05$ s. Thus $(2t_1 + t_s + t_T)V_m = L_0$ $(2 \times 0.1262 + 0.05 + (0.08/V_m)) = 0.4$ or $V_m = 1.06$ m/s $V_{TOP} = 1.90 + 1.06 = 2.96 < 3.0$ When $L_0 = 0.50$ m, $t_1$, $t_s$ and $V_m$ are similarly calculated on the assumption that the same speed waveform as shown in FIG. 4D is used.

$\Delta/t_1 = 2.5/0.166,$ $\Delta \cdot t_1 = 0.64 - 0.5 = 0.14$ $t_1^2 = (0.166/2.5) \times 0.14,$ or $t_1 = 0.0964\ s,$ $\Delta = 1.452$ m/s $t_s = 0.05\ s$ $(2 \times 0.0964 + 0.05 + 0.08/V_m)V_m = 0.5$ $V_m = 1.73$ m/s $V_{TOP} = 1.452 + 1.73 = 3.18 > 3.0$ This means that $V_{TOP}$ exceeds 120% of $V_{MAX}$. Thus, the speed waveform which is used in this instance must be that one shown in FIG. 4E. Representing a time interval of $V_m + \Delta$ by $t_2$, we have $\Delta/t_1 = V_{MAX}/t_a = 2.5/0.166,$ $\Delta \cdot (t_1 + t_2) = L_{20} - L_0 = 0.14$ $V_m + \Delta = 3,$ $(2t_1 + t_2 + 0.05 + 0.08/V_m)V_m 0.5$ It will be noted that $V_m$ is given as a cubic equation of $t_1$. While the cubic equation may be solved, $L_0$ will be obtained by giving a specific value for $V_m$ as follows:

Assuming that $V_m = 1.7$ m/s, $\Delta = V_{TOP} - V_m = 3 - 1.7 = 1.3$, $t_1 = (0.166/2.5) \times 1.3 = 0.08632$ $\Delta \cdot (t_1 + t_2) = L_{20} - L_0$ $1.3(0.08632 + t_2) = 0.64 - L_0 (2 \times 0.08632 + t_2 + 0.05 + 0.08 \times 1.7) \times 1.7 = L_0$ From these, $t_2 = 0.4060 - L_0/1.3$ Thus $L_0 = 0.498$ m, and $t_2 = 0.023$ s.

A similar calculation can be repeated for various values of $V_m$ to yield the results as indicated below.

| $V_m$(m/s) | $\Delta$(m/s) | $t_1$(2nd) | $t_2$(2nd) | $t_s$(2nd) | $t_T$(2nd) | $L_0$(m) |
|---|---|---|---|---|---|---|
| 1.6 | 1.4 | 0.093 | 0.018 | 0.05 | 0.05 | 0.485 |
| 1.7 | 1.3 | 0.086 | 0.023 | 0.05 | 0.047 | 0.498 |
| 1.8 | 1.2 | 0.080 | 0.029 | 0.05 | 0.044 | 0.509 |
| 1.9 | 1.1 | 0.073 | 0.036 | 0.05 | 0.042 | 0.520 |
| 2.0 | 1.0 | 0.066 | 0.043 | 0.05 | 0.040 | 0.531 |
| 2.1 | 0.9 | 0.060 | 0.050 | 0.05 | 0.038 | 0.541 |
| 2.2 | 0.8 | 0.053 | 0.058 | 0.05 | 0.036 | 0.551 |
| 2.3 | 0.7 | 0.046 | 0.066 | 0.05 | 0.035 | 0.561 |
| 2.4 | 0.6 | 0.040 | 0.075 | 0.05 | 0.033 | 0.571 |
| 2.5 | 0.5 | 0.033 | 0.084 | 0.05 | 0.032 | 0.581 |

Thus, when the shorter preset length $L_0$ is increased, $V_m$ becomes equal to $V_{MAX}$ st the corner of the L-V curve, and while the waveform remains as shown in FIG. 4A for a greater $L_0$, there is a margin for $t_s$. Thus $t_1=(0.166/2.5)\times 0.5=0.0332$ $0.5(0.0332\times t_2)=0.64-L_0(2\times 0.0332+1.2468-L_0/0.5+t_s+0.080/2.5)=L_0$

| $L_0$(m) | $V_m$(m/s) | $\Delta$(m/s) | $t_1$(s) | $t_T$(s) | $t_2$(s) | $t_S$(s) |
|---|---|---|---|---|---|---|
| 0.59 | 2.5 | 0.5 | 0.0332 | 0.032 | 0.0668 | 0.071 |
| 0.60 | 2.5 | 0.5 | 0.0332 | 0.032 | 0.047 | 0.095 |
| 0.61 | 2.5 | 0.5 | 0.0332 | 0.032 | 0.027 | 0.119 |
| 0.62 | 2.5 | 0.5 | 0.0332 | 0.032 | 0.007 | 0.143 |
| 0.63 | 2.5 | 0.389 | 0.0258 | 0.032 | — | 0.168 |

At $L_0=0.63$ m, the speed waveform returns to that shown in FIG. 4D, and from the described relations, we have $t_1^2=(0.166/2.5)\times(0.64-0.63)$ $t_1=0.0258$ s, $\Delta=(2.5/0.166)t_1=0.389$ m/s, and from the relationship:

$(2\times 0.0258+t_s+(0.08/2.5))\times 2.5=0.63$, $t_s=0.168$ s

As $L_0$ further approaches $L_{20}$, $\Delta$ decreases, and the acceleration and the deceleration are eliminated at $L_0=L_{20}$, and for $L_0>L_{20}$, the speed waveform transfers to that for the intermediate preset length.

It will be seen from the foregoing that most sever control requirements are imposed for
1) a longer preset length ($L_0 \geq 1.055$ m in the above example) when the line speed V is equal to $V_{MAX}$ on the L-V curve (FIG. 4A), and
2) for a shorter preset length (which is $L_0 \geq 0.581$ m in the above example) when the line speed V is equal to $V_m$.

It will be seen that the NC on-the-fly rotary shear represents a harsh environment for the machine in that the acceleration and the deceleration is severe. As a consequence, an increased magnitude of mechanical impacts is applied, and a repeated application of such impact has a significant influence upon the useful life of the machine. Oscillations caused by the impact may become external disturbances which frequently causes a variation in the cut length or degrade the quality of cut end. In addition, a difficulty may be experienced in achieving an alignment between the cutting edges or the useful life of the cutting edges may be reduced.

Points having the possibility to impact the machine are indicated by circles in FIG. 5 utilizing the various motor speed waveforms shown in FIG. 4. It will be seen that a point which may impact the machine is located at a break point in the speed waveform, and includes five varieties from 1 to 5, which will be described below.

Variety 1: A change from the acceleration to the deceleration for the waveform shown in FIG. 4B for a shorter preset length is steepest. Such a change occurs during a rapid acceleration with an allowable motor torque when an opposite torque is instantaneously applied to cause the decelration. For example, in the course of acceleration with +2 G (where G represents a gravitational acceleration) a switching to -1.5 G may be required, causing an impact of 3.5 G.

Variety 2: A change from the deceleration to the acceleration in the speed waveform shown in FIG. 4C for an intermediate preset length. For example, during the deceleration with 1.5 G, a switching to the application of an acceleration of +1.5 G may be required, causing an impact of 3 G.

Variety 3: When an acceleration is initiated from a stop condition for a longer preset length. For example, an impact amounting to +1.5 G may be applied when at rest.

Variety 4: Where an accelerating or a decelerating torque is applied during rotation at a constant speed. For example, a torque of +1.5 G or −1.5 G may be applied. However, because the motor is rotating at this time, a mechanical oscillation which results from the impact will be usually less than that caused during the time when the torque is applied at the rest condition.

Variety 5: On-the-fly positioning by acceleration (for longer and intermediate preset lengths), stop positioning by deceleration (for longer preset length), on-the-fly positioning by deceleration (for shorter preset lengths A and B), and the speed limitation during an acceleration (shorter preset length B). It is to be noted that while the five speed waveforms shown in FIGS. 2, 4 and 5 have pointed corners, in actuality, these corner portions are rounded because it is in a control process, and there is no sudden change in the torque.

As mentioned previously, an acceleration is established in the design which satisfy the L-V curve, provided as the machine specification required. However, during an actual operation, the line speed V is not always equal to $V_{MAX}$ or $V_m$, but is lower than these values in almost all cases. An investigation of various parts of the motor speed waveforms or specifically, $t_1$, $t_s$, $t_T$ or the like in such instances according to a conventional numerical control is given below.

Longer Preset Length

It is assumed that the acceleration remains as preset, and it is assumed that the same figure are used as used in the above numerical example. An example of speed waveform is shown in FIG. 6A. V is assumed to be 80% of $V_{MAX}$, or $V=2.5\times 0.8 =2.0$ m/s. Then $t_1$ is calculated as follows:

$t_1=t_a\times V/V_{MAX}=0.166\times 0.8=0.1328$

Thus, $t_1$ becomes reduced than $t_a$ but $t_T$, which is calculated as indicated below:

$t_T=L_0/V=0.08/2=0.04$ becomes longer than 0.032 s at $V=V_{MAX}$. Denoting a length of time which follows the zone θ and during which the speed V is maintained by $t_G$, it follows that $(t_G+t_1/2)V=L'_{2H}$. Since with have $L'_{2H}=(t_a/2)\cdot V_{MAX}=(0.166/2)\times 2.5=0.2075$, it is seen that $t_G=0.03735$ s. Utilizing the relationship:

$(t_1/2+t_s+t_T)V+L'_{2H}=L_{20}$, we have $t_s=0.11$. While we had $t_s=0.058$ s at $V=V_{MAX}$, $t_G$ occurs for $V<V_{MAX}$, increasing the length of $t_s$.

Intermediate Preset Length

An example of speed waveform is shown in FIG. 6B. Again we assume that $V=2.0$ m/s. For $L_0=0.9$ m, $T=0.9/2=0.45$. Using the following relationships:

$\Delta/t_1=V_{MAX}/t_a=2.5/0.166$, $\Delta\cdot t_1=L_0-L_{20}=0.9-0.64=0.26$, it follows that $t_1=0.1314$ s. Both $t_T$, $t_G$ remain the same as for the longer preset length. Accordingly, we have $t_s=T-2t_1-t_T t_G=0.45-2\times 0.1314-0.04-0.0375=0.11$ Since we had $t_s=0.065$ s for $V=V_{MAX}$, it is seen that the length of $t_s$ is increased.

Shorter Preset Length

Because the zone $\gamma$ is absent, the speed waveform remains the same as shown in FIGS. 4D and 4E.

A) For the speed waveform as shown in FIG. 4D, the line speed V is assumed to be 90% of $V_m$.

For $L_0=0.4$ m, $V=V_m \times 0.09 = 0.954$ m/s

As in FIG. 4D, $t_1=0.1262$ s, $\Delta=1.9$ m/s, $t_T=0.08386$ s, $V+\Delta=2.854<3$ $(2 \times 0.1262 + t_s + 0.08386) \times 0.954 = 0.4$ Using the last equation, we have $t_s = 0.083$ s Thus while we had $t_s=0.05$ s for $V=V_m$, the length of $t_s$ becomes longer.

B) For the speed waveform as shown in FIG. 4E, it is examined what will occur to $t_s$ at 90% of $V_m$ when $L_0=0.561$ m, knowing that $V_m=2.3$ m/s as obtained from the results of calculations made for various values of $V_m$ which are made previously in connection with FIG. 4E.

$\Delta = V_{TOP} - V = 3.0 - 2.07 = 0.93$, $t_T = 0.08/2.07 = 0.03865$, $t_1 = (0.166/2.5) \times 0.93 = 0.06175$ s Similarly, from the equation $0.93(0.06175+t_2)=0.64-0.561$, we have $t_2=0.0232$ s. Also from the equation $(2 \times 0.06175 + 0.0232 + t_s + 0.03865) \times 2.07 = 0.561$ we have, $t_s=0.086$ s. It is seen that the length of $t_s$ becomes longer since we had $t_s=0.05$ s at $V=V_m$. Thus it will be seen that the settling time $t_s$ becomes longer than necessary as the line speed is reduced below $V_m$ also for shorter preset lengths. For an intermediate and a longer preset length, as the line speed is reduced below $V_{MAX}$, the zone $\gamma$ occurs and the settling time $t_s$ becomes also longer than necessary.

SUMMARY OF THE INVENTION

The present invention enables the acceleration and the deceleration to be moderated as much as possible by utilizing the settling time $t_s$ and $t_G$ which have a surplus length.

The invention premises a method of an on-the-fly rotary shear in which a difference between a stock run length $L_1$ and a run length $L_2$ of a cutting edge which occurs as a result of its rotation as well as a circumferential length $L_{20}$ produced by one revolution of the cutting edge are subtracted from a preset cut length $L_0$ to define a remaining length, which is then converted into a corresponding speed, termed as a remaining length speed, which is again subtracted from a stock running speed to provide a speed reference for the rotation of the cutting edge, an acceleration or a deceleration taking place in accordance with a sign, either positive or negative, of the remaining length to reduce the remaining length toward zero, and in which an on-the-fly cutting takes place in the proximity of the remaining length of zero while the rotation of the cutting edge tracks the running of the stock.

In accordance with the invention, a positioning settling time $t_s$ and a cutting time interval $t_T$ during which cutting edges are brought into contact with a stock, both of which are defined in the proximity of the remaining length equal to zero, are subtracted from a period of time allotted to a cutting operation, which is determined by a preset cut length $L_0$ and a stock running speed V, to define a remaining time. During a fraction of the remaining time which excludes time intervals used for the acceleration and the deceleration, the rotation of the cutting edges maintain a speed difference $\Delta$ relative to the stock running speed V. The time intervals which are used for the acceleration and the deceleration of the rotation of the cutting edges are made as long as possible during the remaining time.

A calculation is made to determine the positioning settling time $t_s$ and a time interval $t_2$ during which the speed difference $\Delta$ is maintained when a preset cut length $L_0$, a stock running speed V, a speed difference $\Delta$, and a coefficient k which determines an acceleration used during the rotation of the cutting edges are given. In this calculation, a choice is made to minimize the speed difference $\Delta$ and coefficient k under conditions that $t_s$ is equal to or greater than a minimum value $t_{s0}$ which is empirically determined and $t_2$ is equal to or greater than a minimum value $t_{20}$ which is also empirically determined. Selected values of the speed difference $\Delta$ and the coefficient k are stored in a memory using the preset cut length $L_0$ and the stock running speed V as address.

A calculation is made to determine the positioning settling time $t_s$ and a time interval $t_2$ during which the speed difference $\Delta$ is maintained when a preset cut length $L_0$, a stock running speed V, a speed difference $\Delta$ and a coefficient k which determines an acceleration used during the rotation of the cutting edges are given. In this calculation, the coefficient k is fixed to a value which is determined by the machine specification and the value of the speed difference $\Delta$ is chosen which is as small as possible under the conditions that $t_s$ is equal to or greater than a minimum value $t_{s0}$ which is empirically determined and $t_2$ is positive and is as large as possible. A chosen value of the speed difference $\Delta$ is stored in a memory using a preset cut length $L_0$ and a stock running speed V as an address. The speed difference $\Delta$ is read from the memory to be selected.

A positioning settling time $t_s$ in the proximity of a remaining length near zero and a cutting time $t_T$ during which the cutting edges are brought into the contact with the stock are subtracted from a period of time allotted to a cutting operation which is determined by a preset cut length $L_0$ and a stock running speed V to define a remaining time. As much as possible of the remaining time is used for the acceleration and the deceleration of the rotation of the cutting edges.

For each cut, the rotation of the cutting edges is decelerated until they are stopped, and a stop interval is provided before the acceleration is entered subsequently. A calculation is made to determine the positioning settling time $t_s$ when a preset cut length $L_0$, a stock running speed V and a coefficient k which determines an acceleration to be applied to the rotation of the cutting edges are given. A value of the coefficient k is chosen which is as small as possible under the condition that $t_s$ is equal to or greater than a minimum value $t_{s0}$ which is empirically determined. The coefficient thus chosen is stored in a memory using the preset cut length $L_0$ and the stock running speed V as an address. Subsequently, the coefficient k is read out from the memory to be selected.

For a longer cut length in which the rotation of the cutting edges is brought to stop after each cut and the acceleration is resumed after a stop interval, an entrance zone is provided during which the rotation of the cutting edges maintain a speed difference $\Delta$ relative to the stock running speed V before the acceleration is initiated toward the cutting operation.

A calculation is made to determine a positioning settling time $t_s$, an entrance interval $t_2$ during which the speed difference $\Delta$ is maintained, and a stop interval $t_4$ when a preset cut length $L_0$, a stock running speed V, a remaining length $L_C$ which exists at the beginning of the entrance zone, a speed difference $\Delta$ and a coefficient k which determines an acceleration to be applied to the rotation of the cutting edges are given. During the calculation, the remaining length $L_C$ at the beginning of the entrance zone is calculated and values of the speed difference $\Delta$ and coefficient k are chosen which are as small as possible under the conditions that $t_s$ is equal to or greater than a minimum value $t_{s0}$ which is empirically determined, $t_a$ is equal to or greater than a minimum value $t_{20}$ which is also empirically determined and $t_4$ is positive. Values of the remaining length $L_C$ at the beginning of the entrance zone, the speed difference $\Delta$ and the coefficient k which are previously chosen are stored in a memory using the preset cut length $L_0$ and the stock running speed V as address. Subsequently, the remaining length $L_C$ at the beginning of the entrance zone, the speed difference $\Delta$ and the coefficient k are read from the memory to be selected. The content stored in the memory is manually modified during the adjustment in a trial run.

Formulas which are used to carry out the invention will be derived below.

Intermediate Preset Length

A cut length which permits a speed waveform as shown in FIG. 7A to be used is referred to as an intermediate cut length. The acceleration of a motor 14 can be changed by varying a gain coefficient of a speed converter 33 (see FIG. 3). Thus, representing a numerical value at the input of a numerical speed converter 33 by T, an output therefrom by V and a gain coefficient by K, the conversion characteristic of the converter 33 can be represented as $V=KD^{1/2}$.

Representing a time interval required to accelerate from a stop condition to a maximum speed $V_{MAX}$ under 100% torque by $t_a$, and a distance over which the acceleration takes place over the time interval $t_a$ by $D_m$, an acceleration $\alpha_m$ can be expressed as follows:

$$D_m = t_a V_{MAX}/2 \qquad (1)$$

$$\alpha_m = V_{MAX}/t_a$$

Representing $V_{MAX} = K_m D_m^{1/2}$, $$K_m = V_{MAX}/D_m^{1/2}$$

$$D_m = V_{MAX}^2/K_m^2$$

Denoting $K = kK_m$ (where k is a positive value less than 1), and utilizing the relationship $V_{MAX} = kK_m \sqrt{D_{km}}$, a distance $D_{km}$ over which the motor speed is accelerated to $V_{MAX}$ is expressed as follows:

$$D_{km} = V_{MAX}^2/k^2 K_m^2 = D_m/k^2 \qquad (2)$$

A time interval $t_{ak}$ required to accelerate to $V_{MAX}$ is given as follows:

$$D_{km} = V_{MAX} t_{ak}/2 \qquad (3)$$

From the equations (1), (2) and (3), we have $t_{ak} = t_a/k^2$. The acceleration $\alpha$ is determined as $\alpha = k^2 \alpha_m$ in view of the relationship $\alpha_m = V_{MAX}/t_a$.

Formulas are derived on the basis of the illustration in FIG. 7A. Specifically, upon completion of a cutting interval, the deceleration is immediately initiated over a interval $t_1$, which is followed by a time interval $t_2$ during which a constant speed $V-\Delta$ is maintained, followed by an acceleration positioning. It will be seen from a comparison of FIGS. 6B and 7A that in accordance with the invention, the zone $\gamma$ ($t_G$) is omitted, thus saving $t_G$, and the same time can be utilized by $t_1$ and $t_2$.

Specifically, the speed reference is switched to $V-\Delta$ so that the deceleration is immediately entered without a returning to the home position by the use of the counter 25 as shown in FIG. 3. However, an arrangement is made so that an acceleration resulting from a limitation of a slew late in the speed reference is equal to an acceleration produced by the DV converter 33. Accordingly, in FIG. 7A, both the acceleration positioning time and the deceleration time are equal to $t_1$. A machine of the kind described involves a reduced mechanical loss, and what matters about motor is only its inertia. Accordingly, by using the same time interval $t_1$, the torque can be substantially equal during both the acceleration and the deceleration.

After the end of cutting interval, the motor is decelerated for the time interval $t_1$, maintained at the constant speed for the time interval $t_2$ and accelerated for the time interval $t_1$ for a distance $L_0-L_{20}$. In other words, the dimension $L_0-L_{20}$ is indexed from the speed difference $\Delta$. From a region 43 shown hatched in the speed waveform, the following relationships are obtained:

$$\Delta/t_1 = \alpha = k^2 \alpha_m,$$

$$t_1 = \Delta/(k^2 \alpha_m)$$

$$\Delta \cdot (t_1 + t_2) = L_0 - L_{20},$$

$$t_2 = (L_0 - L_{20})\Delta - t_1$$

where $0 < \Delta \leq V - \Delta_0$

Thus, during the interval $t_2$, the motor is rotated at at least the minimum speed $\Delta_0$ without reaching a stopped condition. In this manner, an impact of the variety 3 shown in FIG. 6 can be eliminated.

It is assumed that $t_2 \leq t_{20}$. If the length of $t_2$ is too short, there occurs a rapid change in the torque, and accordingly, an arrangement is made to switch the torque at an interval in consideration of the control speed. As a consequence, an impact of the variety 2 shown in FIG. 6 can be eliminated.

A formula which determines K and $\Delta$ is derived.

$$t_T = L_T/V (L_T: \text{length of zone } \theta)$$

From the equality $T = 2t_1 + t_2 + t_s + t_T$, we have $$t_s = T - (2t_1 + t_2 + t_T)$$

where $T = L_0/V$ $$t_s = \frac{L_0}{V} - \left( \frac{\Delta}{k^2 \alpha_m} + \frac{L_0 - L_{20}}{\Delta} + \frac{L_T}{V} \right) \geq t_{s0} \qquad (4)$$

$$t_2 = \frac{L_0 - L_{20}}{\Delta} - \frac{\Delta}{k^2 \alpha_m} \geq t_{s0} \qquad (5)$$

$$0 < \Delta \leq V - \Delta_0 \qquad (6)$$

A target of $t_{s0}$ is 0.05, but is preferably 0.1 or more if this is permitted by the margin. It is empirically chosen in accordance with oscillation of the machine or a fluctuation in the stock running speed. $t_{20}$ may be chosen in a range from 0.02 to 0.05. k and $\Delta$ are chosen which satisfy the relationships (4) to (6) with value of V and $L_0$ given, on the understanding that the smaller the better. It is also to be noted that k is preferentially determined and then $\Delta$ is calculated. Since k is effective to the second power, it is desirable to choose $\Delta$ which provides a margin to $t_s$ when the value of the k is chosen below a given limit.

If a choice is made that $t_2=t_{20}=0$, there is no zone having a speed difference $\Delta$, but a small value of k can be chosen from the equations (4) and (5).

Longer Preset Length

When the length $L_0$ increases, it is unavoidable that a temporary stop be provided. An instance which involves a temporary stop is referred to as a longer preset length. Since the acceleration need not be the maximum acceleration $\alpha_m$ unless for $V_{MAX}$, a corresponding formula is derived. By putting $\Delta=V$ in the equation (4), we have $$t_s = \frac{L_{20}}{V} - \left( \frac{V}{k^2\alpha_m} + \frac{L_0}{V} \right) \geq t_{s0} \tag{7}$$

A speed waveform which satisfies the equation (7) is illustrated in FIG. 7B. Equation (7) represents an approach directed only to reducing the acceleration, but there is an alternative approach which changes an impact of the variety 3 to an impact of the variety 4 in FIG. 5 by providing an entrance region. Specifically, as shown in FIG. 7C, an acceleration takes place over an interval $t_3$ from a stop condition, and then an entrance region is provided by running at a constant speed for an interval $t_2$, followed by an acceleration positioning control. A formula directed at this end will be derived below.

A speed used in the entrance region is denoted by $V-\Delta$, a remaining length at the commencement of the entrance region by $L_C$, and an acceleration at the beginning of the entrance region is chosen to be the same as used during the acceleration positioning control, a time interval during which a stop condition is continued by $t_4$, and a time interval from the end of cutting interval to the stop by $t_5$. It is then possible to determine the following relationships from the speed waveform shown in FIG. 7C:

$$t_s = \Delta/k^2\alpha_m,\ t_3 = (V-\Delta)/k^2\alpha_m,\ t_1 = \Delta/k^2\alpha_m,$$

$$t_T = L_T/V,\ L_c = t_3 \cdot (V+\Delta)/2 + t_2 \cdot \Delta + t_1 \cdot \Delta/2,$$

thus $t_2 = L_c/\Delta - t_1/2 - (t_3/2) \cdot (V+\Delta)/\Delta$ $\qquad = L_c/\Delta - V/2k^2\alpha_m - (V-\Delta) \cdot V/2k^2\alpha_m\Delta V$ From $(t_5/2 + t_4) = L_0 - L_{20} - L_c,$ $t_4 = (L_0 - L_{20} - L_c)/V - t_5/2$ $\quad = T - (L_{20} + L_c)/V - t_5/2$ $T = L_0/V = t_5 + t_4 + t_3 + t_2 + t_1 + t_s + t_T$ $\quad = t_5 + T - (L_{20} + L_c)/V - t_5/2 + t_3 + L_c/\Delta - t_1/2 - (t_3/2) \cdot (V/\Delta) -$ $\quad\quad t_3/2 + t_1 + t_s + t_T$ $\quad = (t_5 + t_3 + t_1)/2 + T - (L_{20} + L_c)/V + L_c/\Delta - (t_3/2) \cdot (V/\Delta) + t_s + t_T$ $$t_S = \frac{L_{20} + L_c}{V} - \left( \frac{V}{k^2\alpha_m} + \frac{L_c}{\Delta} - \frac{(V-\Delta) \cdot V}{2k^2\alpha_m\Delta} + \frac{L_T}{V} \right) \geq t_{s0} \tag{8}$$

$$t_4 = \frac{L_0 - L_{20} - L_c}{V} - \frac{V}{2k^2\alpha_m} > 0 \tag{9}$$

$$t_2 = \frac{L_c}{\Delta} - \frac{V}{2k^2\alpha_m} - \frac{(V-\Delta)V}{2k^2\alpha_m\Delta} \geq t_{20} \tag{10}$$

There is no significance for the entrance region unless $t_2 \geq t_{20}$. Where $t_4 \leq 0$, the relationships (4) to (6) given above for intermediate preset length are used.

Shorter Preset Length

A speed waveform used with a shorter preset length is illustrated in FIG. 7D. As for the longer preset length, $\Delta/t_1=\alpha=k^2\alpha_m$, $t_1=\Delta/k^2\alpha_m$ where $0 \leq \Delta V_{TOP}-V$.

$\Delta \cdot (t_1+t_2)=L_{20}-L_0$

Thus $t_2=(L_{20}-L_0)/\Delta-t_1$ $t_2 \geq t_{20}$

This allows an impact of the variety 1 shown in FIG. 5 to be eliminated. In the similar manner as the relationships (4) to (6) are obtained, the following relationships are obtained:

$$t_s = \frac{L_0}{V} - \left( \frac{\Delta}{k^2\alpha_m} + \frac{L_{20}-L_0}{\Delta} + \frac{L_0}{V} \right) \geq t_{s0} \tag{11}$$

$$t_2 = \frac{L_{20}-L_0}{\Delta} - \frac{\Delta}{k^2\alpha_m} \geq t_{20} \tag{12}$$

$$0 \leq \Delta \leq V_{TOP} - V \tag{13}$$

Using given values of the line speed V and the preset cut length $L_0$, values of k and $\Delta$ which satisfy the relationship (11) to (13) are chosen, on the understanding that the smaller the values of k and $\Delta$, the better. The value of k is preferentially is determined, and then $\Delta$ is calculated. As far as the value of k is reduced below a given value, it is advisable to chose a value of $\Delta$ which provides a margin to $t_s$. When a choice is made such that $t_2=t_{20}=0$, a small value of k can be chosen according to the equations (11) and (12) even though the speed difference $\Delta$ is not maintained.

For any of an intermediate, a longer and a shorter preset length, the choice of a value of k which is less than 1 allows an impact of the variety 4, or even the variety 5 shown in FIG. 5 to be alleviated.

The applicability of the above formulas to a point on the L-V curve or to the maximum speed will be dealt with below. Specifically, if k is left to be equal to 1 in the relationships (4) to (6) or (11) to (13), a choice of $t_2=t_{20}$ alleviates the impacts of the variety 1 and variety 2 shown in FIG. 5, and $t_2$ indicated by the equations (8) to (10) alleviates an impact of the variety 3 shown in FIG. 5. Accordingly, the invention enables an improvement even on the point on the L-V curve.

Numerical Examples

Variety 1

There remains a problem that how much $t_s$ can be reduced when a speed waveform shown in FIG. 4D which is properly chosen for $L_0$ is replaced by a speedwave form shown in FIG. 4E. In FIG. 4D, or for a speed waveform which applies an impact of the variety 1, $V_m=1.06$ m/s for $L_0=1.4$ m, and $t_s=0.05$ s. For the same length, a value of $t_s$ is determined when the speed is accelerated to $V_{TOP}$ after the end of the cutting interval, and $V_{TOP}$ is maintained for an interval $t_2=t_{20}=0.05$ s and is then decelerated as shown in FIG. 8A. Values of $\alpha_m=V_{MAX}/t_a=2.5/0.166$, k=1, $V=V_m=1.06$ m/s and $L_T=0.08$ m are substituted into the equations (11) and (12) to yield the following:

$$\Delta=1.562 \text{ m/s}$$

$$t_s=0.0445 \text{ s}$$

Thus, the settling time $t_s$ is reduced by 0.0055 second as compared to the use of FIG. 4D, but has no substantial influence upon the control because the reduction is very slight, while allowing the impact of the variety 1 to be alleviated.

Variety 2

It is noted that with a speed waveform as illustrated in FIG. 4E, $L_0=0.9$ m, $V=V_{MAX}=2.5$ m/s and $t_s=0.065$ s. For the same values of $L_0=0.9$ m and $V=V_{MAX}=2.5$ m/s, a constant speed zone $t_2$ as indicated in FIG. 4 is provided between the deceleration and the acceleration, as shown in FIG. 8B. A calculation is made to see how much $t_s$ decreases for k=1 and $t_2=0.05$ s. From the equations (4) to (6), we have $$\Delta=1.638 \text{ m/s}$$

$$t_s=0.0605 \text{ s}$$

$$t_2=(0.26/\Delta)-(0.166/2.5)\Delta=0.05$$

From this, it is seen that an impact of the variety 2 is alleviated by the reduction in the settling time in an amount of 0.0045 second in comparison to the arrangement of FIG. 4C.

Variety 3

With the speed waveform as shown in FIG. 4B, we had $t_s=0.058$ s for $V=V_{MAX}=2.5$ m/s and acceleration $\alpha_m=2.5/0.166$. An entrance zone is added to this set-up, as indicated in FIG. 7C. It is assumed that $\Delta=2.5-0.25=2.25$ and $t_2=t_{20}=0.05$ s for $L_C$. From the equations (8) to (10), we have $$L_C=0.3075 \text{ m}$$

$$t_s=0.048 \text{ s}$$

Thus, a reduction of about 0.01 second in the settling time $t_s$ allows an impact of the variety 3 to be alleviated even for the longer preset length.

Now, a boundary value of $L_0$ between the intermediate and the longer preset length given in the above numerical examples will be determined. When $t_4=0$ in FIG. 7C or when an entrance zone $t_3$ starts immediately after $t_5$ in FIG. 8C, we have $$t_3+t_1+t_5=2t_5=2\times0.166,$$

$$t_2=0.05$$

$$T=t_3+t_2+t_1+t_5+t_I+t_5=0.462$$

Hence $$L_0=0.462\times2.5=1.155 \text{ m}$$

This represents a boundary value. In the prior art as illustrated in FIG. 4B, the boundary between the intermediate and the longer preset length was 1.055 m. This means that a longer preset length in a range from 1.055 to 1.155 according to the classification of the prior art is subject to the speed waveform for the intermediate preset length in accordance with the invention.

It has been demonstrated in the above that the invention allows an impact upon the machine to be moderated even at the maximum speed, but FIG. 9 illustrates that the moderation is even more remarkable on the inside of rather than on the L-V curve. In FIG. 9, the speed waveform according to the prior art is shown on the left side, and a corresponding speed waveform according to the invention is shown on the right side. It will be noted that k=0.7 or the acceleration is chosen to be $0.7^2=49\%$.

DETAILED DESCRIPTION OF THE PREFERRED EMBODIMENTS

Figure 1:
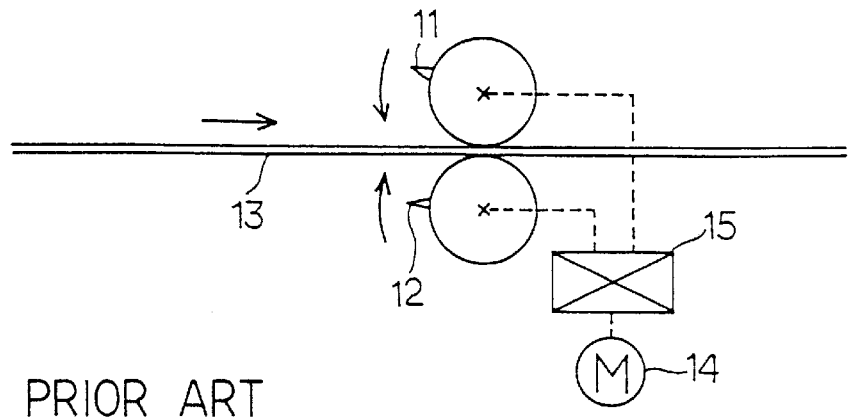
FIG. 1 is a schematic illustration of the principle of a mechanical on-the-fly rotary shear.
Figure 2A:
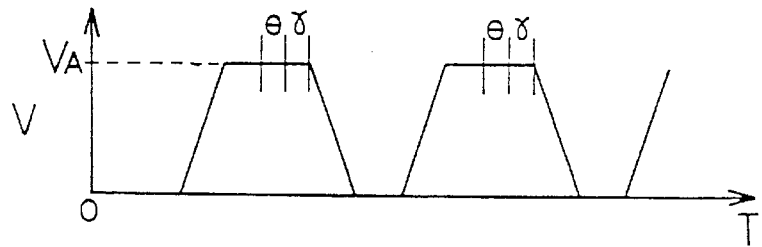
FIG. 2 graphically illustrates a manner of change in the speed of the cutting edges of the conventional rotary shear with respect to the time, A being for a longer cut length, B for an intermediate cut length and C and D for shorter cut lengths.
Figure 2B:
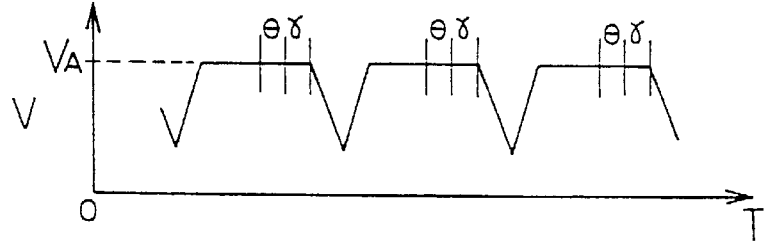
Figure 2C:
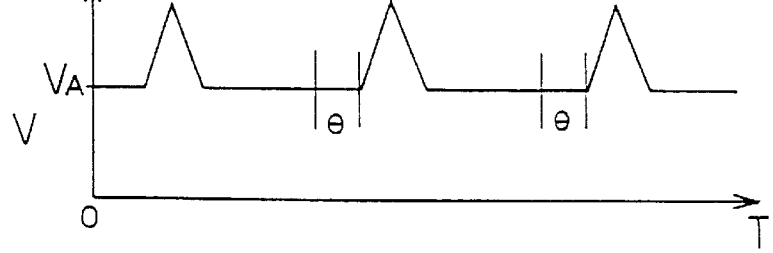
Figure 2D:
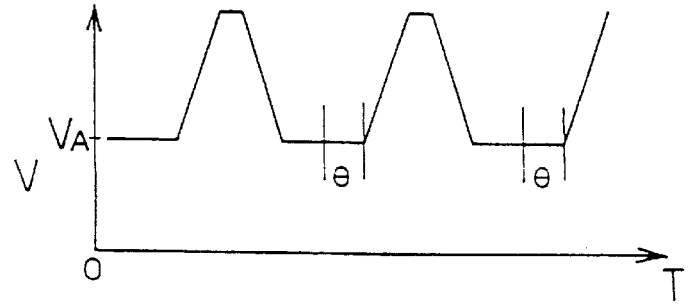
Figure 3:
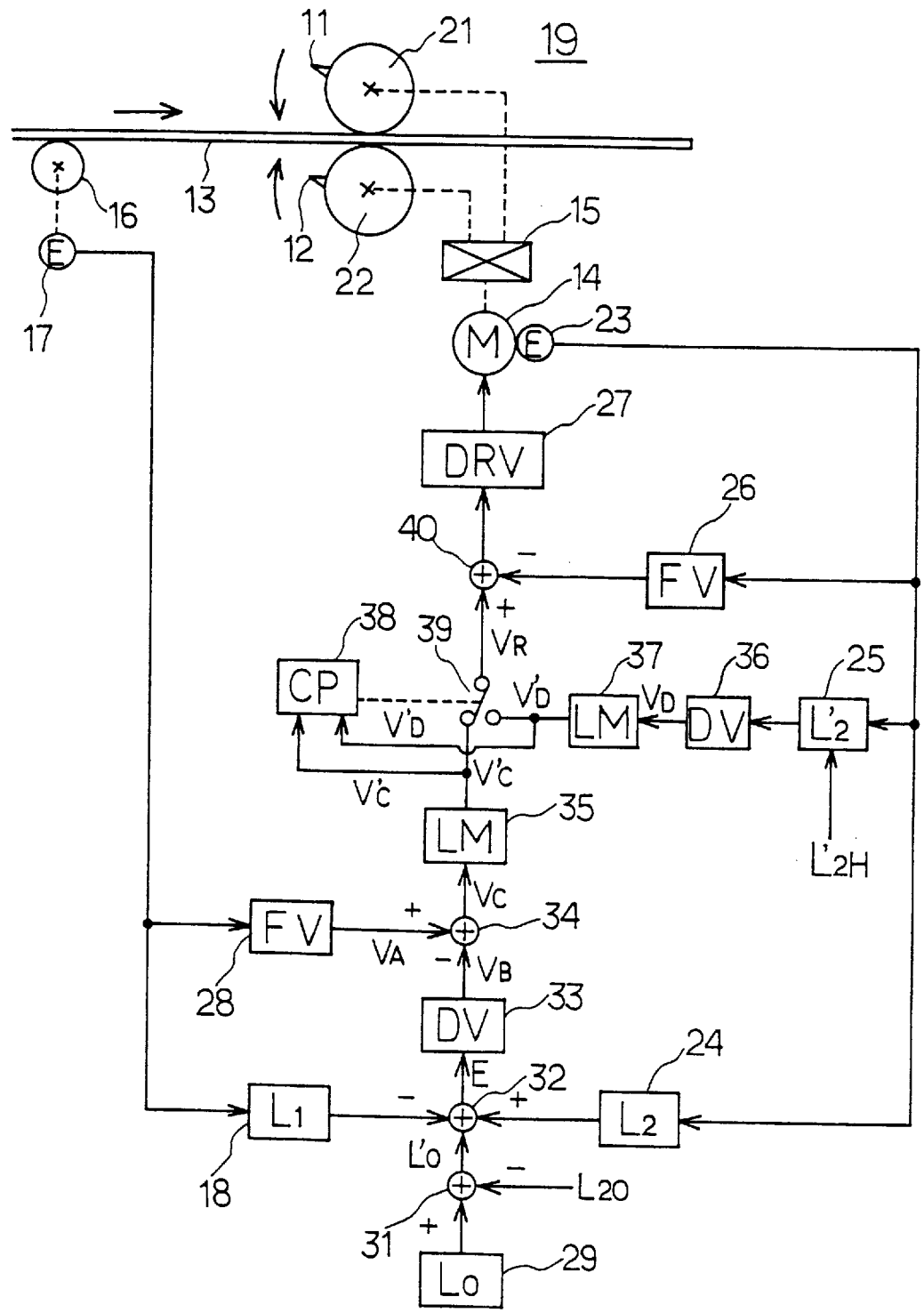
FIG. 3 is a block diagram of an example of a numerical control system for an on-the-fly rotary shear of the prior art.
Figure 4A:
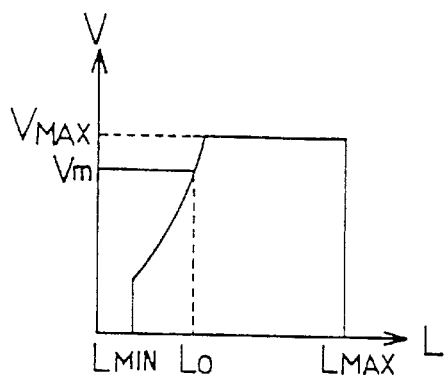
FIG. 4A is a graph plotting a stock running speed V against preset cut length L or L-V curve which represents a machine specification for the rotary shear.
Figure 4B:
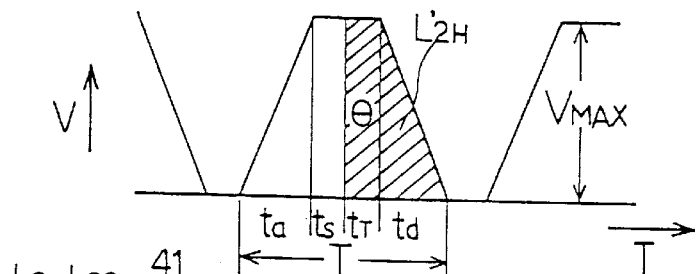
FIGS. 4B to 4E illustrate conventional speed waveform diagrams which are used to determine the L-V curves, B being for a longer preset length, C for an intermediate preset length and D and E for shorter preset lengths.
Figure 4C:
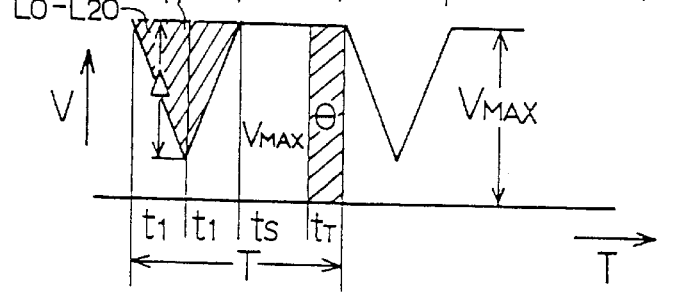
Figure 4D:
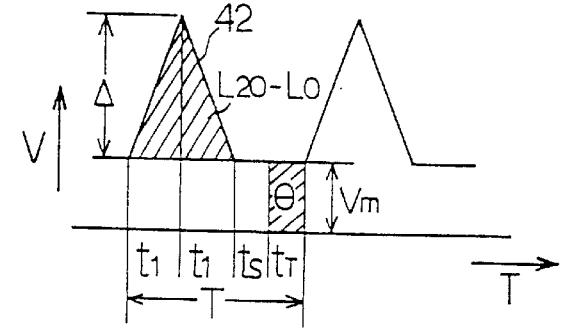
Figure 4E:
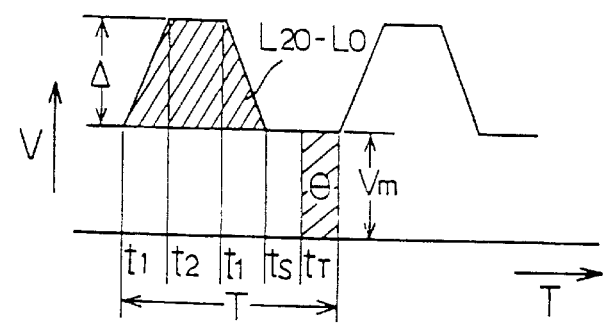
Figure 5A:
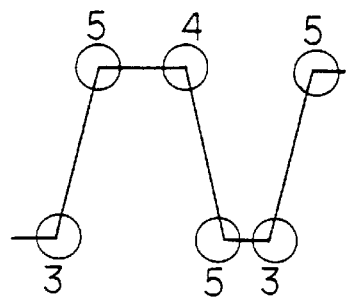
FIG. 5 is a graphical illustration of occurrence of a harsh load upon the machine in a conventional rotary shear, the location of the occurrence being indicated by circles on corresponding speed waveforms, A being a longer preset length, B an intermediate preset length, and C and D for shorter preset lengths.
Figure 5B:
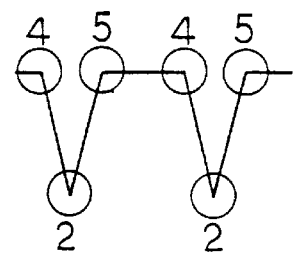
Figure 5C:
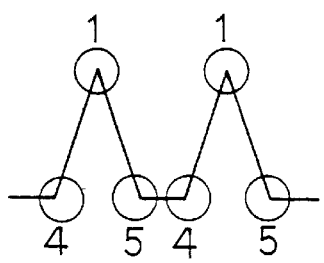
Figure 5D:
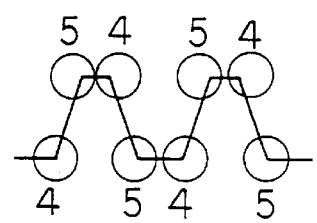
Figure 6A:
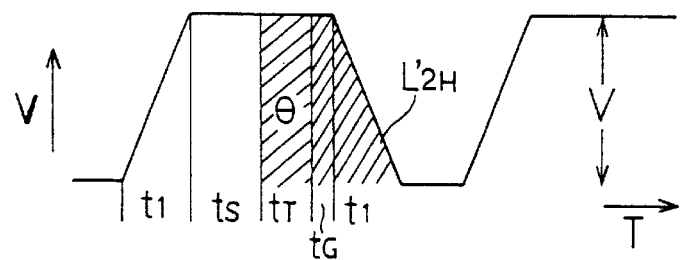
FIG. 6 is a graphical illustration of a speed waveform to describe the occurrence of the $t_G$ to increase the length of the settling time $t_s$ under a condition of use in which a stock running speed is located below the L-V curve in a conventional numerical control, A being for a longer preset length and B for an intermediate preset length.
Figure 6B:
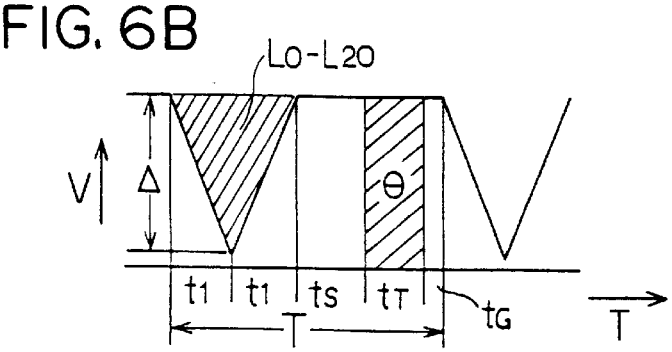
Figure 7A:
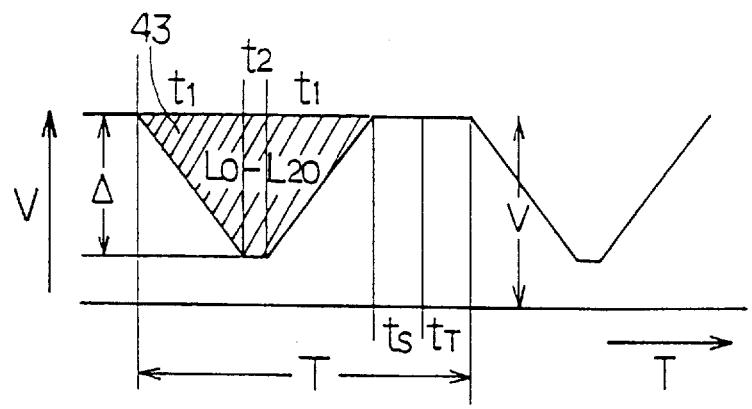
FIG. 7 is a series of graphical diagrams indicating a speed waveform for the cutting edges when the method of the invention is applied, plotting the speed on the ordinate against the time on the abscissa, A being for a longer preset length, B and C for intermediate preset lengths, and D for shorter preset length.
Figure 7B:
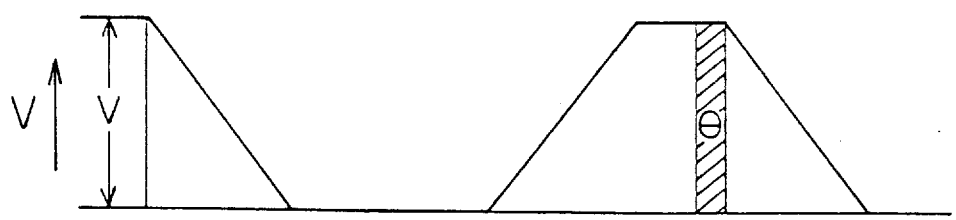
Figure 7C:
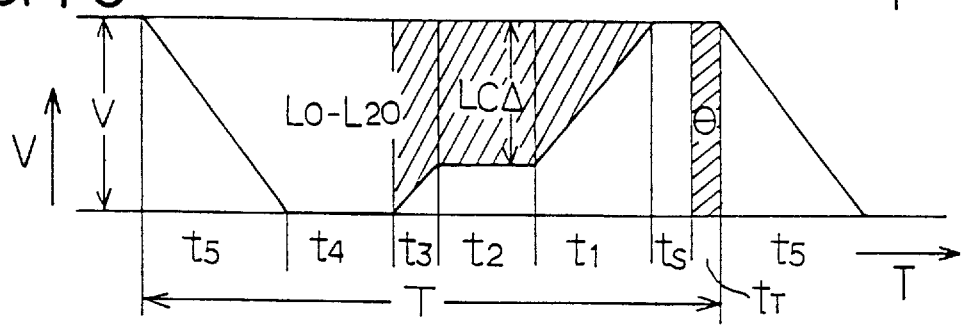
Figure 7D:
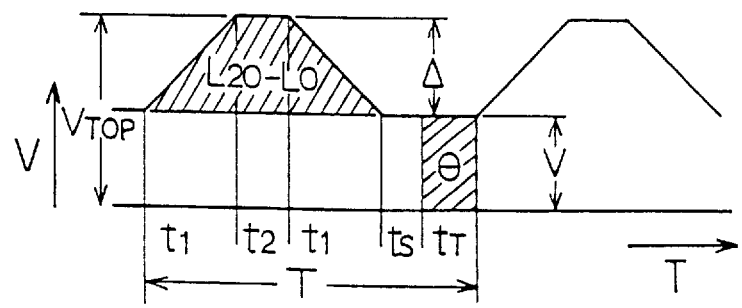
Figure 8A:
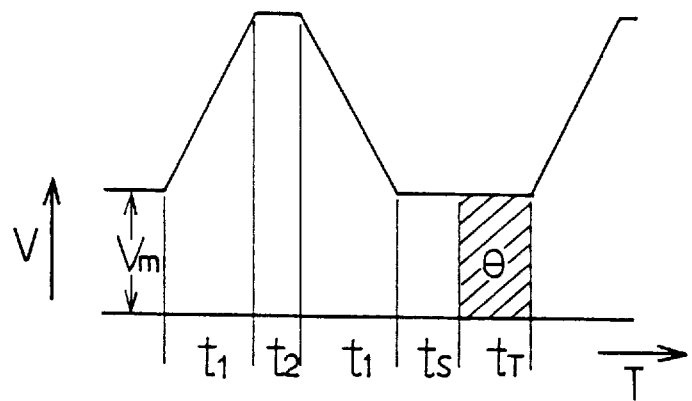
FIG. 8 is a series of graphical diagrams for speed waveforms to be used with the cutting edges when the method of the invention is applied to harsh points on the L-V curve, A being for a shorter preset length, B for an intermediate preset length, and C for longer preset length.
Figure 8B:
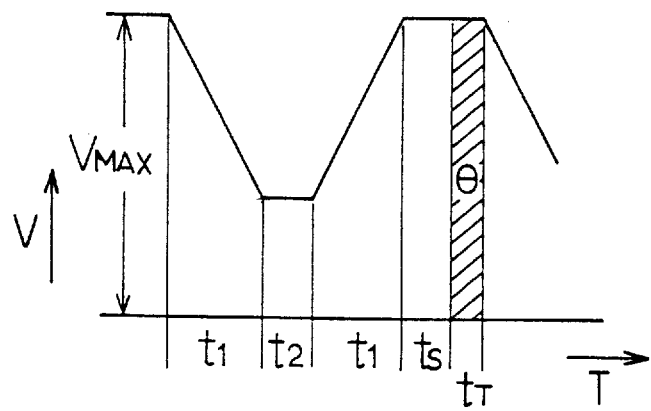
Figure 8C:
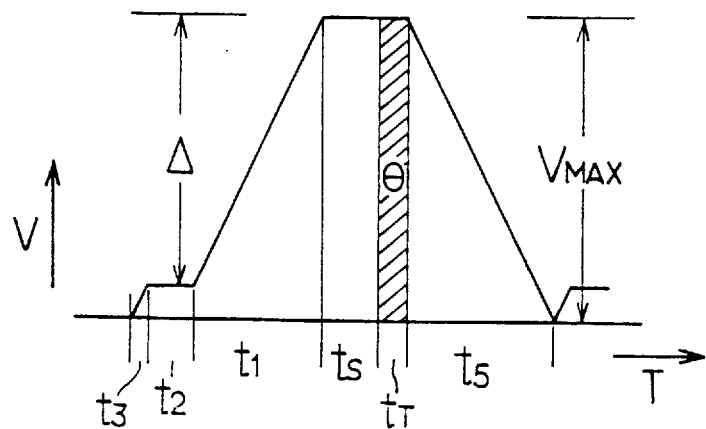
Figure 9A:
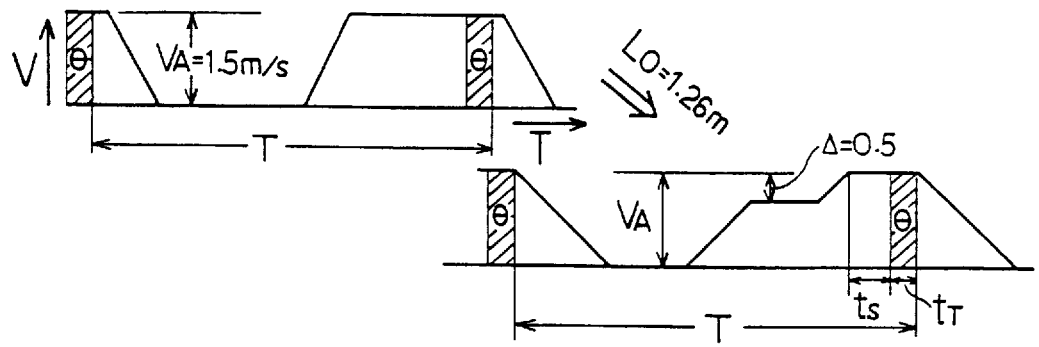
FIG. 9 is a series of graphical illustrations of speed waveforms in which those used with the prior art are shown on the left side while corresponding waveforms in accordance with the invention are indicated on the right side for purpose of comparison, A and B for a longer preset lengths, C for an intermediate preset length, and D for shorter preset length.
Figure 9B:
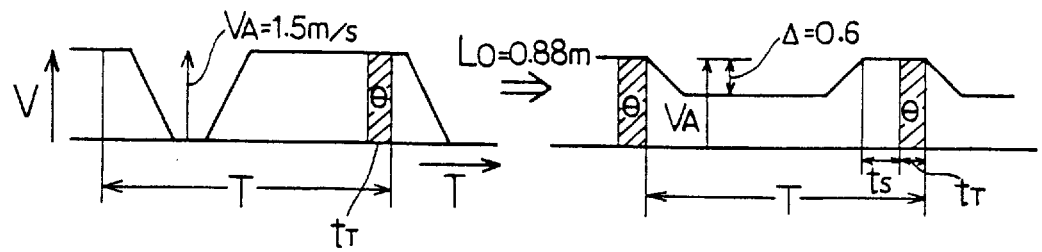
Figure 9C:
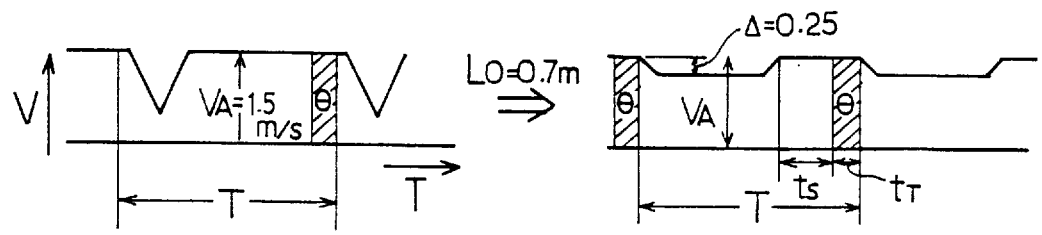
Figure 9D:
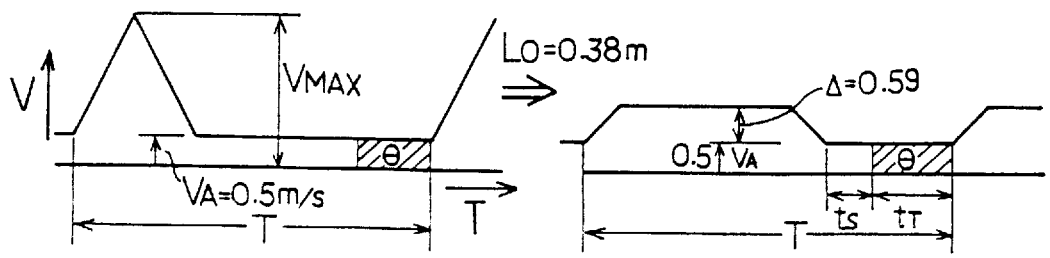
Figure 10A:
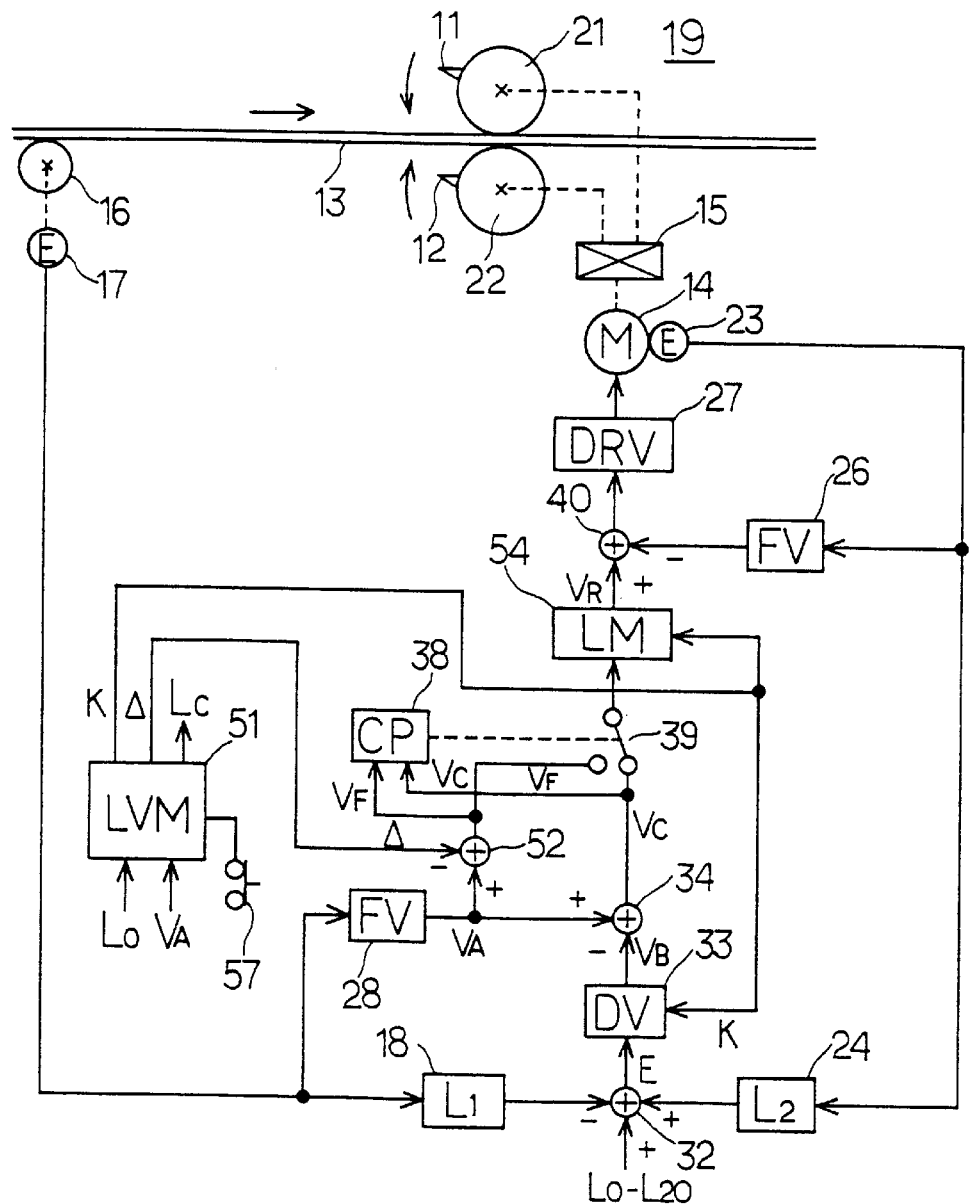
FIG. 10A is a block diagram of one form of a numerical control system according to the invention.

An embodiment of the invention is shown in FIG. 10A where parts corresponding to those shown in FIG. 3 which illustrates the prior art arrangement, are designated by like numerals and characters as used before. As mentioned previously, k, $\Delta$ and $L_C$ are determined according to the equations or relations (4) to (6), (7) or (8) to (10), or (11) to (13). It is to be noted that $L_C$ is unnecessary when the equation (7) is used even for a longer preset length. While a corresponding calculation may be performed according to a selected formula each time such calculation is needed by using a computer of high operational speed, in the present embodiment, an arrangement is illustrated in which these parameters are calculated beforehand and are stored in a memory 51.

Figure 10B:
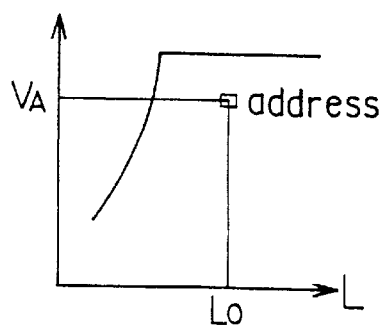
FIG. 10B is a graphical illustration of constituting an address in a memory 51 shown in FIG. 10A.

As shown in FIG. 10B, an area within or below the L-V curve is finely divided along axes which are parallel to the preset cut length axis and the line speed axis respectively, and each sub-region formed as a result of such division is assigned an address defined by values of L and V. In this manner k, $\Delta$ and $L_C$ are previously calculated, and are stored in the memory 51 at an address defined by a combination of L and V. Initially, values which are calculated according to the equations (4) to (6), the equation (7), the relationships (8) to (10), and the equations (11) to (13) are written into the memory, and subsequently, k, $\Delta$ and $L_C$ are modified as required on the basis of a trial run. This is convenient in that a modification according to the practice can be made with emphasis on addresses which are distributed in a practical region.

k represents a control gain or coefficient which determines an acceleration, and cannot be chosen too small in order to maintain an accuracy. Accordingly, six levels of k in a range from 1 to 0.7 such as 1.0, 0.95, 0.90, 0.84, 0.77 and 0.7 may be chosen, and suitable value of k is chosen from these levels. As long as the settling time $t_s$ is greater than $t_{s0}$ with a certain margin, a smaller value of $\Delta$ can be chosen.

The memory 51 is read out for each cut, for example, or each time a preset length $L_0$ is preset, and a speed difference $\Delta$ which is read out from the memory 51 is subtracted from a stock running speed $V_a$ fed from an FV transducer 28 in an adder 52, an output of which is fed as an adjusted speed $V_F$ to a limiter 54 through a switch 39. A corrected remaining length speed $V_C$ and the adjusted speed $V_F$ are supplied to a comparator 38, which operates to cause the switch 39 to select either one of them, which is greater, to be fed to a driver circuit 27 through the limiter 54 and the adder 40, as a speed reference $V_R$. The coefficient k which is read out from the memory 51 is set up in the limiter 54 in which a slew late thereof is limited in accordance with the magnitude of the coefficient k. The coefficient k which is read out is also set up in a DV converter 33 so that a coefficient used in the speed conversion depends on the magnitude k. In this manner, the coefficient k is used to establish a variety of accelerations.

The operation of the embodiment will now be described, beginning from the end of the zone $\theta$ or the completion of the cutting operation.

Initially, at the end of the zone $\theta$, a next cut length $L_0$ and a current line speed $V_A$ determine an L-V address (see FIG. 10B). Accordingly, a coefficient k which determines an acceleration, a speed difference $\Delta$ and a remaining length $L_C$ at the beginning of the entrance zone are read out from the memory 51. For a shorter preset length ($L_0<L_{20}$), $\Delta$ assumes a negative value, whereby $V_F=V_A-\Delta>V_A$. Since $V_A$ is continually varying, it is preferred that an address is selected for relatively higher value of $V_A$, with hysteresis which prevents an excessive sensitiveness to a variation in the value of $V_A$. Advantageously, a manual button 57 may be provided to allow an on-site intervention with the read-out from the memory 51. The button 57 may be utilized to shift an L-V address where a read-out takes place laterally or vertically. However, it is advantageous to permit an incremental change of $\Delta$ directly while simultaneously re-writing the content of the memory 51.

Intermediate Preset Length

When $E=L_0-L_{20}-L_1+L_2$ which prevails at the end of the zone $\theta$ or the residual deviation $e_0$ is read, counts $L_1$ and $L_2$ of the counters 18 and 24, respectively, are cleared, whereby $E=L_0-L_{20}+e_0$. In response thereto, an output $V_B=kK_mE^{1/2}$ from the DV converter 33 increases while $V_C=V_A-V_B$ is reduced below $V_F=V_A-\Delta$, whereby the switch 39 selects $V_F$. The limiter 54 suppresses the input $V_F$ to the acceleration of $k^2\alpha_m$, thereby providing a speed reference $V_R$. Subsequently the remaining length decreases as does the remaining length speed $V_B$, and when $V_C=V_A-V_B \geq V_F$, the comparator 38 controls the switch 39 to select $V_C$ as the speed reference which initiates a positioning acceleration followed by a settling time $t_s$ and subsequent zone $\theta$.

Longer Preset Length

For a longer preset length, $\Delta$ which is read-out from the memory 51 is chosen to make $V_F=0$. Since $V_C=V_A-V_B<0$ at the end of the zone $\theta$, the comparator 38 causes the switch 39 to select $V_F$. The limiter 54 causes a deceleration with a gradient of $k^2\alpha_m$ until a stop condition is reached. Subsequently $V_C \geq 0$, whereupon the switch 39 selects $V_C$, entering an acceleration positioning, which is followed by a settling time $t_s$ and a subsequent zone $\theta$.

Figure 10C:
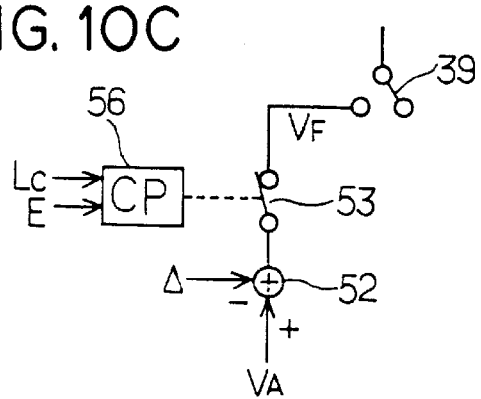
FIG. 10C is a block diagram indicating an additional function of providing an entrance zone for a longer preset length.

When an entrance zone is used, a comparator 56 compares a remaining length $L_C$ at the beginning of the entrance zone and the remaining length E against each other as shown in FIG. 10C, and turns a switch 53 on or off. A length $L_C$ of the entrance zone which is read out from the memory 51 is small, and counts $L_1$ and $L_2$ of the counters 18 and 24 are cleared while the remaining length E is large, and as long as $L_C-E<0$, the switch 53 remains off, and the output from the limiter 54 is $V_F=0$. Accordingly, a stop condition is reached in the same manner as when no entrance zone is used. However, the remaining length E decreases with time to result in $L_C-E \geq 0$, whereupon the switch 53 is turned on and $V_A-\Delta$ is applied to the limiter 54 in a step-wise manner. However, because the limiter 54 limits the slew late to $k^2\alpha_m$, the output from the limiter 54 increases linearly. The acceleration continues until $V_A-\Delta$ is reached, and which continues during the entrance zone. Subsequently, when $V_C \geq V_F$, the comparator 38 causes the switch 39 to select $V_C$ as the speed reference $V_R$, thus entering a positioning acceleration, which is followed by $t_s$ and a subsequent zone $\theta$.

Shorter Preset Length

Again, at the end of the zone $\theta$, a read-in of the residual deviation $e_0$ and a clearing of counts $L_1$ and $L_2$ in the counters 18 and 24 take place. However, in this instance, the operation starts with the remaining length $E=L_0-L_{20}+e_0<0$. Thus, since the remaining length speed starts from $V_B=-kK_m(L_0-L_{20}+e_0)^{1/2}$, the output from the adder 34 immediately jumps to $V_C=V_A-V_B>V_A$. However, the output $V_R$ from the limiter 54 increases while being suppressed by the limitation of the slew late $k^2\alpha_m$. In case of a shorter preset length, the comparator 38 causes the switch 39 to select $V_C$ at the start. As $V_C$ increases and when $V_C \geq V_F=V_A-\Delta$ (where $\Delta$ is negative, $V_A-\Delta \leq V_{TOP}$), the comparator 38 causes the switch 39 to select $V_F$. Subsequently when $V_C \leq V_F$, the comparator 38 causes the switch 39 to select $V_C$, thus entering a positioning deceleration, which is followed by a settling time $t_s$ and the subsequent zone $\theta$.

In the above description, an arrangement has been chosen for an intermediate and a shorter preset length so that during a remaining time which is defined by excluding a settling time $t_s$ and a cutting time $t_T$ from the period of time T used for the cutting operations, a time interval during which a speed difference $\Delta$ is maintained as well as a time interval used for the acceleration/deceleration be taken as long as possible. However, by fixing the coefficient k which determines the acceleration to a value which depends on the machine specification, a value may be chosen for the speed difference $\Delta$ which is as small as possible. Alternatively, the use of a speed difference $\Delta$ may be avoided, and the time interval used for the acceleration and/or deceleration be chosen as long as possible. In addition, instead of choosing the values of k, $\Delta$ and $L_C$ for each cutting operation, the choice may be made only when the preset cut length $L_0$ or the stock running speed V is changed, in extreme instances.

As mentioned above in connection with FIG. 3, although an arrangement of FIG. 10A is shown as a control circuit which comprises a hardware, it is to be understood that in actuality, the arrangement is implemented by a software by using a computer.

As discussed, in accordance with the invention, a settling time $t_s$ which is required for a positioning control as well as a cutting time $t_T$ during which the cutting edges are brought into contact with a stock are excluded from a period of time allotted to a cutting operation which is determined by the preset length $L_0$ and the stock running speed $V_A$ to define a remaining time, and a fraction of the remaining time which is chosen as long as possible is used to rotate the cutting edges while maintaining a speed reference $\Delta$ with respect to the stock running speed, which is chosen to be as small as possible, and/or the acceleration applied to the rotation of the cutting edges in order to achieve such speed difference $\Delta$ is chosen to be as less as possible below a level of a maximum acceleration which is demanded from the machine specification. Accordingly, a mechanical impact upon the machine is moderated or reduced to increase the useful life of the machine, a variation in the cut length from cut to cut is reduced, and the quality of the cut end is improved. In addition, an alignment of the cutting edges is facilitated, increasing the useful life of the cutting edges. In the prior art practice, a large motor is used for the drive, which causes sounds of impact or percussion to be produced upon impact of the variety 1 or 2 at an acoustical level higher than the sound produced by the cutting operation itself depending on the variety of the stock, but the invention is capable of reducing such sounds of impact to a barely audible level. It will be seen that this has a great influence upon the useful life of the machine, considerably increasing the useful life.

What is claimed is:

1. A method of controlling an on-the-fly rotary shear in which a difference between a run length $L_1$ of a stock and a circumferential length $L_2$ which results from a rotation of a cutting edge is subtracted, together with a circumferential length $L_{20}$ corresponding to one revolution of the cutting edge, from a preset cut length $L_0$ to define a remaining length, which is then converted into a speed, referred to as a remaining length speed, which is subtracted from a stock running speed to define a speed reference for the rotation of the cutting edge, an acceleration or a deceleration being applied to the rotation of the cutting edge depending on the positive or negative sign of the remaining length to reduce the latter toward zero, thus achieving an on-the-fly cutting of the stock by the cutting edge while the rotational running of the cutting edge tracks the running of the stock in the proximity of the remaining length which is equal to zero;

characterized in that a positioning setting time $t_s$ in the proximity of zero remaining length as well as a cutting time $t_T$ during which the cutting edge is brought into contact with the stock are excluded from a period of time allotted to a cutting operation which is determined by a present cut length $L_0$ and a stock running speed V to define a remaining time during which the rotation of the cutting edge maintains a speed difference $\Delta$ relative to the stock running speed V except for an interval which is used to accelerate or decelerate the rotation of the cutting edge.

2. A method according to claim 1 in which the interval which is used to accelerate or decelerate the rotation of the cutting edge is chosen as long as possible during the remaining time.

3. A method according to claim 2 in which a calculation is made to determine a positioning settling time $t_s$ and an interval $t_2$ during which the speed difference $\Delta$ is maintained when a preset cut length $L_0$, a stock running speed V, a speed difference $\Delta$ and a coefficient k which determines an acceleration applied to the rotation of the cutting edge are given, and in which the speed difference $\Delta$ and the coefficient k are chosen as small as possible from values available from the calculation under the condition that $t_s$ is equal to or greater than a minimum value $t_{s0}$ which is empirically determined and $t_2$ is equal to or greater than a minimum value $t_{20}$ which is also empirically determined.

4. A method according to claim 3 in which the chosen values of the speed difference $\Delta$ and the coefficient k are stored in a memory at an address which is defined by the preset cut length $L_0$ and the stock running speed V, the speed difference $\Delta$ and the coefficient k being read from the memory to be selected by specifying particular combination of $L_0$ and V.

5. A method according to the claim 1 in which a calculation is made to determine a positioning settling time $t_s$ and an interval $t_2$ during which a speed difference $\Delta$ is maintained when a preset cut length $L_0$, a stock running speed V, a speed difference Δ and a coefficient k which determines an acceleration to be applied ton the rotation of the cutting edge are given, and in which a value of the speed difference Δ is chosen to be as small as possible from values available from the calculation under the condition that the $t_s$ is equal to or greater than a minimum value $t_{s0}$ which is empirically determined and $t_2$ assumes a positive value which is as large as possible while fixing the coefficient k to a value which is determined by a machine specification.

6. A method according to claim 5 in which chosen values of the speed difference Δ is stored in a memory at an address defined by combinations of the preset cut length $L_0$ and the stock running speed V, a particular speed difference Δ being read from the memory to be selected.

7. A method of controlling an on-the-fly rotary shear in which a difference between a run length $L_1$ of a stock and a circumferential length $L_2$ which results from a rotation of a cutting edge is subtracted, together with a circumferential length $L_{20}$ corresponding to one revolution of the cutting edge, from a preset cut length $L_0$ to define a remaining length, which is then converted into a speed, referred to as a remaining length speed, which is subtracted from a stock running speed to define a speed reference for the rotation of the cutting edge, an acceleration or a deceleration being applied to the rotation of the cutting edge depending on the positive or negative sign of the remaining length to reduce the latter toward zero, thus achieving an on-the-fly cutting of the stock by the cutting edge while the rotational running of the cutting edge tracks the running of the stock in the proximity of the remaining length which is equal to zero;

characterized in that a positioning settling time $t_s$ in the proximity of zero remaining length as well as a cutting time $t_T$ during which the cutting edge is brought into contact with the stock are excluded from a period of time allotted to a cutting operation which is determined by a present cut length $L_0$ and a stock running speed V to define a remaining time, a fraction of the remaining time which is as long as possible being used to accelerate or decelerate the rotation of the cutting edge.

8. A method according to claim 7 in which after each cut, the rotation of the cutting edge is decelerated to a stop, which continues for a stop interval before a next acceleration is initiated.

9. A method according to claim 7 or 8 in which a calculation is made to determine a positioning settling time $t_s$ when a preset cut length $L_0$, a stock running speed V and a coefficient k which determines an acceleration to be applied to the rotation of the cutting edge are given, a value of the coefficient k which is as small as possible being chosen from the calculation under the condition that $t_s$ is equal to or greater than $t_{s0}$ which is empirically determined.

10. A method according to claim 9 in which chosen values of coefficient k are stored in a memory at an address which is defined by combination of the preset cut length $L_0$ and the stock running speed V, a particular coefficient k being read from the memory to be selected.

11. A method according to the claim 10, further including the step of manually modifying data stored in a memory during a trial run.

12. A method of controlling an on-the-fly rotary shear in which a difference between a run length $L_1$ of a stock and a circumferential length $L_2$ which results from a rotation of a cutting edge is subtracted, together with a circumferential length $L_{20}$ corresponding to one revolution of the cutting edge, from a preset cut length $L_0$ to define a remaining length, which is then converted into a speed, referred to as a remaining length speed, which is subtracted from a stock running speed to define a speed reference for the rotation of the cutting edge, an acceleration or a deceleration being applied to the rotation of the cutting edge depending on the positive or negative sign of the remaining length to reduce the latter toward zero, thus achieving an on-the-fly cutting of the stock by the cutting edge while the rotational running of the cutting edge tracks the running of the stock in the proximity of the remaining length which is equal to zero;

characterized in that where a preset cut length $L_0$ represents a longer preset length in which after each cut, the rotation of the cutting edge is decelerated to a stop, which continues for a stop interval before a next acceleration is entered, an entrance zone is provided during which the rotation of the cutting edge maintains a speed difference Δ relative to the stock running speed V before the acceleration which occurs toward the cutting operation.

13. A method according to claim 12 in which a calculation is made to determine a positioning settling time $t_s$, an entrance interval $t_2$ during which the speed difference Δ is maintained and a stop interval $t_4$ when a preset cut length $L_0$, a stock running speed, a remaining length $L_C$ which occurs at the beginning of the zone, a speed difference Δ and a coefficient k which determines an acceleration to be applied to the rotation of the cutting edge are given, the remaining length $L_C$ at the beginning of the entrance zone being calculated in the calculation under the condition that $t_s$ is equal to or greater than a minimum value $t_{s0}$ which is empirically determined, $t_2$ is equal to or greater than a minimum value $t_{20}$ which is also empirically determined and $t_4$ is positive, values of the speed difference Δ and the coefficient k being chosen which are as small as possible.

14. A method according to claim 13 in which the chosen values of the remaining length $L_C$ at the beginning of the entrance zone, the speed difference Δ and the coefficient k are stored in a memory at an address which is defined by a combination of the preset cut length $L_0$ and the stock running speed V, the remaining length $L_C$, the speed difference Δ and the coefficient k being read from the memory to be selected.

15. A method according to one of claims of 4, 6 or 14, further including a step of manually modifying data stored in the memory in a trial run.

\* \* \* \* \*